(12) United States Patent
Sever et al.

(10) Patent No.: US 8,901,887 B2
(45) Date of Patent: Dec. 2, 2014

(54) MOBILE ELECTRIC APPLIANCE WITH CHARGE STATUS INDICATOR AND BATTERY FOR IT

(75) Inventors: Eduard Sever, Ludesch (AT); Joachim Vedder, Hergensweiler (DE); Franz Huber, Markt Wald (DE); Bernd Ziegler, Landsberg am Lech (DE); Dragomir Ljubojevic, St. Gallen (CH)

(73) Assignee: Hilti Aktiengesellschaft, Schaan (LI)

( * ) Notice: Subject to any disclaimer, the term of this patent is extended or adjusted under 35 U.S.C. 154(b) by 400 days.

(21) Appl. No.: 13/290,381

(22) Filed: Nov. 7, 2011

(65) Prior Publication Data
US 2012/0112689 A1 May 10, 2012

(30) Foreign Application Priority Data

Nov. 8, 2010 (DE) .......................... 10 2010 043 582

(51) Int. Cl.
| | | |
|---|---|---|
| H02J 7/00 | (2006.01) | |
| H01M 10/48 | (2006.01) | |
| A47L 9/28 | (2006.01) | |
| H01M 10/46 | (2006.01) | |

(52) U.S. Cl.
CPC ........... *H01M 10/411* (2013.01); *H02J 7/0004* (2013.01); *H01M 10/488* (2013.01); *A47L 9/2857* (2013.01); *H01M 10/46* (2013.01); *A47L 9/2884* (2013.01); *Y02E 60/12* (2013.01); *A47L 9/2878* (2013.01); *H02J 7/0047* (2013.01)
USPC ............................... 320/122; 320/107; 15/328

(58) Field of Classification Search
USPC ........................................................ 320/107
See application file for complete search history.

(56) References Cited

U.S. PATENT DOCUMENTS

| | | | | | |
|---|---|---|---|---|---|
| 4,965,738 | A | * | 10/1990 | Bauer et al. .................... | 320/136 |
| 5,557,188 | A | * | 9/1996 | Piercey ......................... | 320/134 |
| 6,078,164 | A | | 6/2000 | Park | |
| 6,107,802 | A | * | 8/2000 | Matthews et al. ............. | 324/427 |
| 6,174,617 | B1 | * | 1/2001 | Hiratsuka et al. ............... | 429/90 |
| 2003/0090234 | A1 | * | 5/2003 | Glasgow et al. ............... | 320/107 |
| 2004/0088817 | A1 | * | 5/2004 | Cochran et al. ............... | 15/327.5 |

(Continued)

FOREIGN PATENT DOCUMENTS

| | | |
|---|---|---|
| DE | 10 2005 000 135 A1 | 4/2007 |
| EP | 0 750 215 A2 | 12/1996 |

(Continued)

OTHER PUBLICATIONS

"Quick Reference Guide", Dell Latitude D620, 2006, pp. 1-24.
"Schnellreferenzhandbuch", Dell Latitude D620, 2006, pp. 73-96.
European Search Report, dated Jan. 2, 2012, 6 pages total.

(Continued)

*Primary Examiner* — Drew A Dunn
*Assistant Examiner* — Jerry D. Robbins
(74) *Attorney, Agent, or Firm* — Crowell & Moring LLP

(57) ABSTRACT

A mobile electric appliance is disclosed. The mobile electric appliance includes at least one battery bay for accommodating a battery with at least one voltage-generating cell and a battery-side charge status indicator, an electrical consumer, a power connector, as well as a charging device for charging the at least one battery. In addition, the mobile electric appliance includes means for detecting the charge status of the at least one battery and a device-side charge status indicator arranged on the mobile electric appliance. The battery may also include an interface, which is prepared to relay the charge status determined to an external processing unit.

12 Claims, 3 Drawing Sheets

(56) References Cited

U.S. PATENT DOCUMENTS

2005/0055795 A1* 3/2005 Zeiler et al. .............. 15/353
2007/0080667 A1* 4/2007 Ziegler et al. ............ 320/132
2007/0290653 A1* 12/2007 Ibrahim .................... 320/107

FOREIGN PATENT DOCUMENTS

| EP | 1 419 723 B1 | 5/2004 |
| EP | 2 157 637 A1 | 2/2010 |
| WO | WO 98/01917 A2 | 1/1998 |

* cited by examiner

MOBILE ELECTRIC APPLIANCE WITH CHARGE STATUS INDICATOR AND BATTERY FOR IT

This application claims the priority of German Patent Document No. 10 2010 043 582.1, filed Nov. 8, 2010, the disclosure of which is expressly incorporated by reference herein.

BACKGROUND AND SUMMARY OF THE INVENTION

The invention relates to a mobile electric appliance comprising an appliance housing having at least one battery bay for accommodating a battery with at least one voltage-generating cell and a battery-side charge status indicator, an electric consumer, a power connector as well as a charging device for charging the at least one battery. In addition, the invention relates to a battery comprising a battery housing, at least one voltage-generating cell arranged in the battery housing, a battery-side electronic circuit arranged in the battery housing for determining the charge status of the at least one cell, a battery-side charge status indicator arranged on the battery housing and a switch arranged on the battery housing for activating the battery-side electronic circuit and/or the battery-side charge status indicator. Finally, the invention relates to a set comprising at least one mobile electric appliance and an appropriate battery for it.

One thing users of mobile, battery-operated devices desire is the most convenient possible display of the charge status of an accumulator (also known colloquially as a "battery") provided for operating the device. Most of the time, the charge status is determined and displayed by the device itself. However, batteries deviating from this are also known that are able to display the charge status independently.

A battery for a hand power tool is disclosed in German Patent Document No. DE 10 2005 000 135 A1. This battery features a housing accommodating several battery cells and on which coupling means, which are externally accessible and electrically connected to the battery cells, are provided. In addition, the battery includes a charge status indicator, which can be activated by an externally accessible switch and which displays the charge status of the battery cells. The switch in this case is formed by actuating means of a locking mechanism of the battery.

Moreover, a portable computer is known from U.S. Pat. No. 6,078,164 A, which comprises a battery bay and a battery situated therein. The battery has a charge status indicator which is also visible through a viewing window in the computer's housing when the battery is inserted. The battery has a switch to activate the charge status indicator, which may also be actuated externally with the aid of a knob arranged on the computer. As a result, the charge status of a battery situated in the bay may be determined without the battery having to be removed from the bay.

Finally, a set is known from European Patent Document No. EP 1 419 723 B1 comprising a vacuum cleaner, which may be operated both when connected to the power supply system as well as with batteries. In addition, the batteries may also be used in different electric hand-held devices.

The disadvantage of the known solutions, for example the solution in accordance with U.S. Pat. No. 6,078,164 A, is that the viewing window provided there as well as the knob must be aligned precisely with the charge status indicator and the switch on the battery. On the one hand, incorrect operation can easily lead to a situation where the charge status cannot be queried, for example if the knob in question is not precisely aligned with the switch. On the other hand, the design of the battery must be precisely coordinated with the design of the device being operated. As a result, these types of batteries are not universally useable.

Therefore, the object of the invention is creating an improved mobile electric appliance, an improved battery, and an improved set. In particular, the interchangeability of the batteries is improved and querying the charge status of the same is facilitated.

According to the invention, this object is attained with a mobile electric appliance of the type cited at the outset comprising means for detecting the charge status of the at least one battery and a device-side charge status indicator arranged on the mobile electric appliance. The term "mobile electric appliance" is understood as an electric appliance which can be moved or displaced from one workplace to another workplace even when in operation.

The object of the invention is also attained with a battery of the type cited at the outset comprising an interface, which is prepared to relay the charge status determined to an external processing unit.

Finally, the object of the invention is attained by a set comprising at least one mobile electric appliance according to the invention and an interchangeable, advantageously inventive battery.

This is achieved according to the invention in that the charge status may be displayed both independently on the battery itself as well as by the device being operated. In doing so, the disadvantages mentioned, such as, for example, malfunctions with incorrect alignment of the battery in the device being operated and poor interchangeability of batteries, are overcome. In contrast to this, the arrangement of battery-side switches and battery-side charge status indicators in the case of the invention is independent of the device being operated, because the latter has an its own additional charge status indicator. The user of the mobile device is also immediately able to see whether a battery is inserted into the battery bay without having to open a cover of the battery bay.

The display of the charge status may be accomplished with the use of illuminating means or even mechanically as a bar representation. The illuminating means may be designed to be both round as well as square, rectangular and triangular.

The term "battery bay" should be understood within the scope of the invention as any type of device in which a battery may be inserted or introduced for the purpose of transferring energy.

Advantageous embodiments and further developments of the invention are disclosed in the description in conjunction with the figures.

It is especially advantageous if the means for detecting the charge status are formed by a device-side electronic circuit arranged in the mobile electric appliance, which is connected electrically to the at least one voltage-generating cell. In the case of this variant of the invention, no other connectors are necessary besides those that are present anyway to supply the device in question. Thus, it is possible to implement the invention in reality in an especially simple manner, in particular because existing batteries may continue to be used unchanged.

It is also especially advantageous if the means for detecting the charge status are formed by an interface to a battery situated in the battery bay, wherein the battery includes a battery-side electronic circuit for determining the charge status of the at least one cell and wherein the interface is prepared to receive the charge status determined by the cited first electronic circuit. In the case of this variant of the invention, the device-side electronic circuit may be kept relatively simple, because the charge status of the battery is determined per se by the battery-side electronic circuit. For example, electrical interfaces, optical interfaces or radio interfaces may be used for data transmission (i.e., for transmitting the charge status determined) between the device-side electronic circuit and the battery-side electronic circuit.

It is beneficial if the mobile electric appliance includes a controller, which is prepared to activate the device-side charge status indicator when the electric appliance is being operated by the battery. In this way, a user is always able to read the charge status, or the remaining run-time of the device being operated. For example, the controller may be integrated into a central device controller or into the charging device.

It is also beneficial if the mobile electric appliance includes a controller, which is prepared to deactivate the device-side charge status indicator when the electric appliance is being operated by the power supply system. In this way, electrical energy may be saved, because the charge status is less relevant during operation by the power supply system. A button may be provided as an option which may be used to query the charge status also manually as needed.

It is also beneficial if the mobile electric appliance includes a controller, which is prepared to deactivate the device-side charge status indicator when the electric appliance is switched off. In this state as well, the charge status of the batteries is normally of less interest, which is the reason why the charge status indicator is deactivated for the purpose of saving energy. In this case as well, an optional button may be provided which may be used to query the charge status also manually as needed.

It is also advantageous if the mobile electric appliance is configured as a vacuum cleaner. This is an advantage in particular if the vacuum cleaner is part of a set, which also includes at least one electric hand-held device as well as several batteries that are interchangeable between the at least one electric hand-held device and the at least one mobile electric appliance. Most of the time, a vacuum cleaner is made of a movable base part and a suction nozzle connected therewith via a suction hose. Because the base part normally does not have to be lifted during vacuuming but is merely pulled along behind, a vacuum cleaner is very well suited as a central charging station for the relatively heavy batteries. In this way, it is possible for batteries to be charged conveniently at the construction site or in the household. On the one hand, an empty battery of an electric hand-held device (e.g., cordless screwdriver, cordless drill, cordless saw, cordless grinder, cordless planer, cordless table vacuum cleaner, cordless search lamp, cordless radio, etc.) may be interchanged for a fully charged one from the vacuum cleaner. On the other hand, the vacuum cleaner may also be operated independently, i.e., without being connected to the electric supply system. Because of the measures according to the invention, the charge status of a battery is always visible, both when it is inserted into the mobile electric appliance as well as when the battery is removed. The advantage of the invention is especially striking in this case. However, these advantages are not limited to vacuum cleaners, but also apply to additional displaceable or moveable devices or devices whose base part is only moved comparatively seldom. Another example of such a device is a high-pressure cleaner.

It is noted at this point that the variants listed for the mobile electric appliance according to the invention and the resulting advantages also apply correspondingly to the battery according to the invention as well as to the set according to the invention and vice versa.

The above-mentioned embodiments and further developments of the invention may be combined in any manner.

The present invention is explained in more detail in the following on the basis of the exemplary embodiments indicated in the schematic figures.

DETAILED DESCRIPTION OF THE DRAWINGS

In the figures, the same or similar parts are provided with the same reference numbers and, unless indicated otherwise, functionally equivalent elements and features are provided with the same reference numbers but different indexes.

Figure 1:
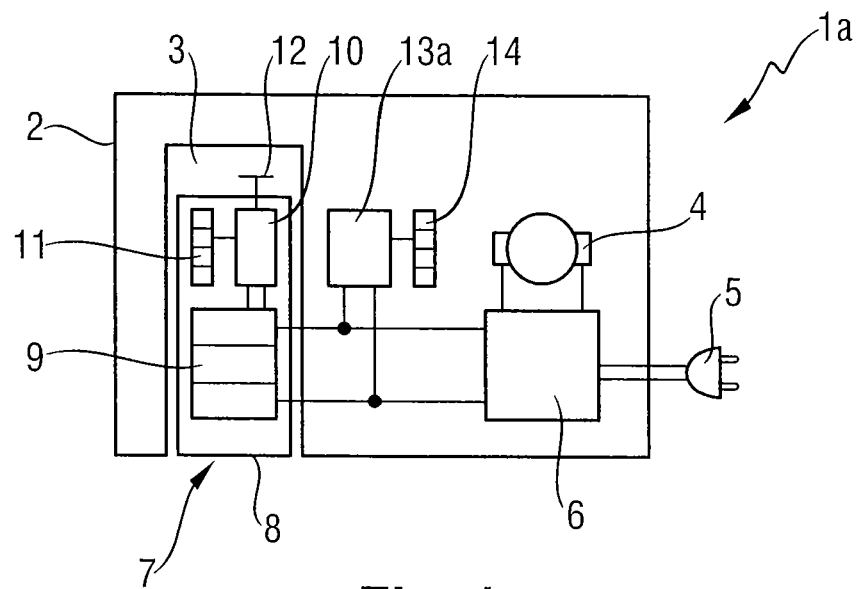
FIG. 1 is a schematic representation of a first embodiment of the invention in the form of a mobile electric appliance.

FIG. 1 depicts a first embodiment of the invention in the form of a mobile electric appliance 1a. It includes an appliance housing 2 having at least one battery bay 3, an electric consumer 4, a power connector 5 and a charging device 6 for charging a battery 7 situated in the battery bay 3. The battery 7 includes a battery housing 8, three voltage-generating cells 9 arranged in the battery housing 8, a battery-side electronic circuit 10 arranged in the battery housing 8 for determining the charge status of the voltage-generating cells 9, a battery-side charge status indicator 11 arranged on the battery housing 8 and a switch 12 arranged on the battery housing 8 for activating the electronic circuit 10 and/or the charge status indicator 11. According to the invention, the mobile electric appliance 1a includes a detector, or means, in this case formed by a device-side electronic circuit 13a arranged in the mobile electric appliance 1a, for detecting the charge status of the at least one battery 7 and a device-side charge status indicator 14 arranged on the mobile electric appliance 1a for displaying the charge status.

The function of the depicted electric appliance 1a is as follows.

If the power connector 5 is connected to the electric supply system, the consumer 4 is supplied with electricity via the power supply network. Similarly, a battery 7 situated in the battery bay 3 may be charged via the power supply system. If the device 1a is disconnected from the power supply system, then the consumer 4 is supplied with electric energy by the battery 7. The charging device 6 provides for the desired distribution of energy during the various operating states. However, it is also conceivable for this task to be handled by another electronic component part.

If the battery 7 is inserted into the battery bay 3, neither the switch 12 is accessible nor is the battery-side charge status indicator 11 visible, which is controlled by the battery-side electronic circuit 10 for determining the charge status of the voltage-generating cells 9. In addition, the battery bay 3 may be closed with a cover (not shown). For this reason, the charge status of the cells 9 is determined by the device-side electronic circuit 13a, which is electrically connected to the voltage-generating cells 9, and displayed on the device-side charge status indicator 14.

The device-side charge status indicator 14 is advantageously activated when the electric appliance 1a is being operated by the battery. For this, the electric appliance 1a includes a controller, which is integrated into the charging device 6 or a central device controller (not shown). The device-side charge status indicator 14 is advantageously deactivated when the electric appliance 1a is being operated by the power supply system and/or when the electric appliance 1a is switched off.

Figure 2:
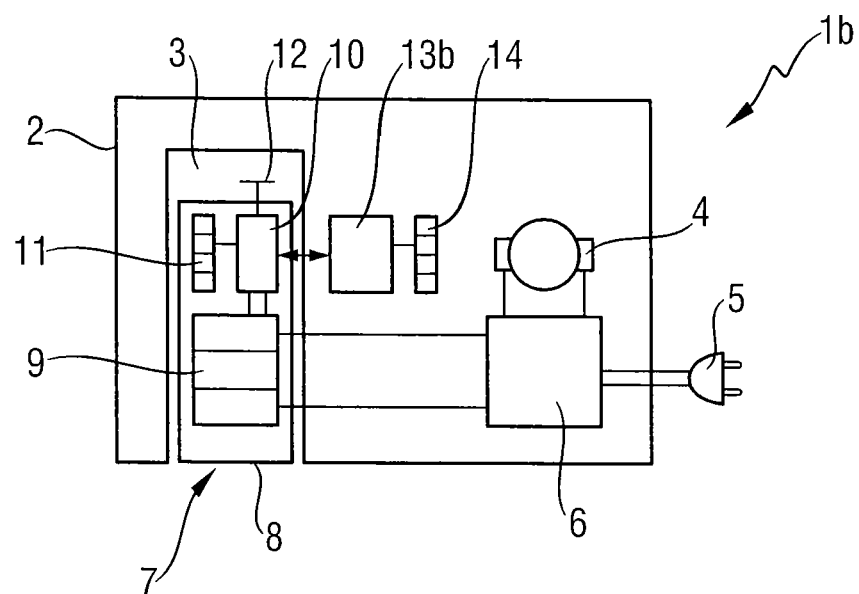
FIG. 2 is a schematic representation of a second embodiment of the invention in the form of a mobile electric appliance.

FIG. 2 shows a mobile electric appliance 1b, which is very similar to the electric appliance 1a depicted in FIG. 1. In contrast to this, the detector, or means, for detecting the charge status is formed by an interface 13b to a battery 7 situated in the battery bay 3, which is prepared to receive the charge status determined by the battery-side electronic circuit 10. In the case of this variant, no electrical connection is necessary between the device-side electronic circuit 13a and the voltage-generating cells 9. Instead, the device-side electronic circuit 13b is connected to the battery-side electronic circuit 10 via a (data) interface. The interface may be embodied, for example, as an electrical interface, optical interface or radio interface.

Figure 3:
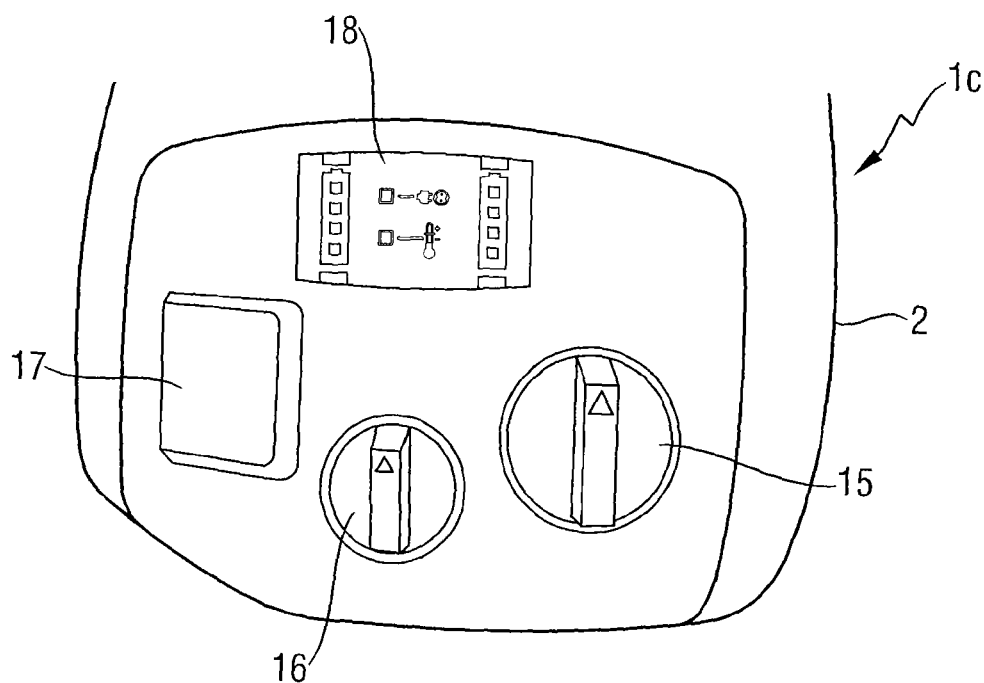
FIG. 3 illustrates a portion of a vacuum cleaner with a charge status indicator according to the invention.

FIG. 3 depicts a mobile electric appliance, which is designed as a vacuum cleaner 1c. It includes a housing 2, a first control knob/switch 15, a second control knob/switch 16, a cover 17 for a battery bay (not shown), as well as a display panel 18.

Figure 4:
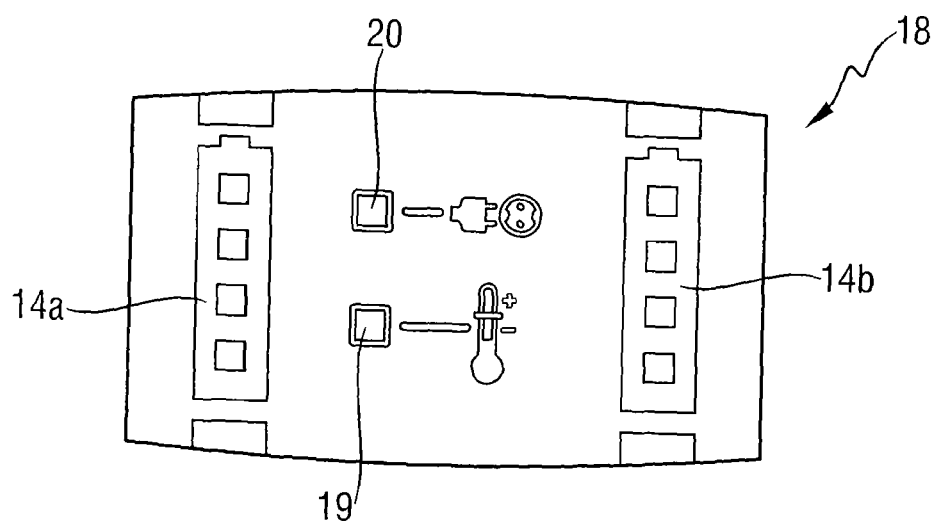
FIG. 4 is a detail of the charge status indicator according to the invention.

FIG. 4 depicts the display panel 18 in detail. It includes a first device-side charge status indicator 14a for a first battery 7 and a second device-side charge status indicator 14b for a second battery 7. In addition, the display panel 18 has a temperature indicator 19 and a power supply indicator 20.

The function of the vacuum cleaner 1c depicted in FIG. 3 or the display panel 18 depicted in FIG. 4 is as follows:

Using the control knobs/switches 15 and 16, the vacuum cleaner 1c may be turned on and off or the suction power may be adjusted in a manner that is known per se. Batteries 7 may be inserted into the battery bay 3 behind the cover 17 so that the vacuum cleaner 1c may also be operated independently and not just when connected to the power supply system. The power supply indicator 20 illuminates when the vacuum cleaner 1c is connected to the power supply system. The charge status indicators 14a and 14b display the charge status of the batteries 7 situated in the battery bay 3, in this case with four light-emitting diodes, which signal a charge status of 25%, 50%, 75% and 100%. If a battery 7 becomes impermissibly hot during operation or charging, this will be displayed on the temperature indicator 19.

The above-mentioned example should be viewed as purely illustratively. Of course, any other arrangement of the indicators 14a, 14b, 19 and 20, a deviating number of batteries 7 as well as a deviating number of light-emitting diodes for the charge status indicators 14a and 14b or a different allocation of the charge status are conceivable.

Figure 5:
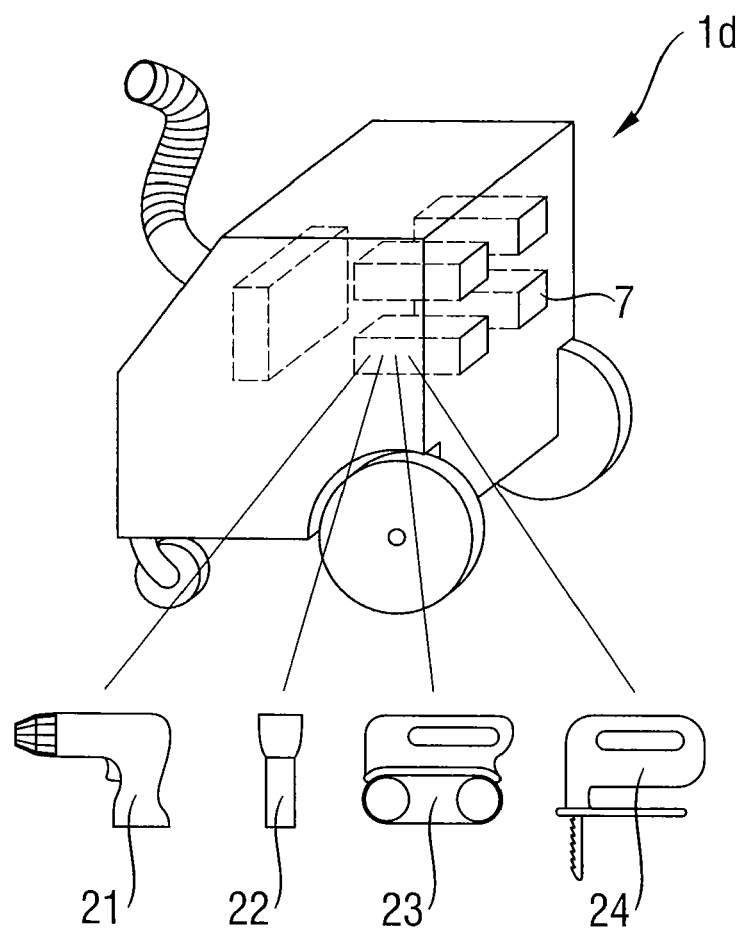
FIG. 5 is a set according to the invention.

FIG. 5 shows an example of a set according to the invention comprising at least one mobile electric appliance, in this case formed by a vacuum cleaner 1d, and at least one battery 7. The set advantageously includes at least one electric hand-held device with a battery bay for accommodating a battery 7. Purely as an example, a cordless screwdriver 21, a flashlight 22, a belt sander 23 as well as a compass saw 24 are provided as electric hand-held devices of the set. Therefore, the set is made up of several modules, which can be combined with each other as needed. Up to four batteries 7 may be inserted into the vacuum cleaner 1d, which may be charged there or used to operate the vacuum cleaner 1d. Situated in the forward portion of the vacuum cleaner 1d is also a controller (not described in more detail), which may also include a charging device for the batteries 7.

Finally, reference is made to the fact that the figures are not to scale in some cases and were also drawn in a very simplified manner. A mobile electric appliance 1a-1d that is executed for real may therefore contain more components than are shown here and may therefore be constructed in a considerably more complex manner than is depicted in the figures. Parts of the arrangements depicted in the figures may also form the basis for independent inventions.

The following list of reference numbers and the technical teachings of the patent claims are considered to be within the scope of the disclosure and disclose additional details of the invention and its exemplary embodiments to a person skilled in the art by themselves or in conjunction with the figures.

List of Reference Numbers

1a-1d Mobile electric appliance
2 Appliance housing
3 Battery bay
4 Electric consumer (motor)
5 Power connector
6 Charging device
7 Battery
8 Battery housing
9 Voltage-generating/galvanic cell
10 Battery-side electronic circuit
11 Battery-side charge status indicator
12 Switch
13a, 13b Device-side electronic circuit
14, 14a, 14b Device-side charge status indicator
15 First control knob/switch
16 Second control knob/switch
17 Cover for battery bay
18 Display panel
19 Temperature indicator
20 Power supply indicator
21 Cordless screwdriver
22 Flashlight
23 Belt sander
24 Compass saw The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mobile electric appliance, comprising:
   an appliance housing including a battery bay;
   a battery with a voltage-generating cell and a battery-side charge status indicator receivable in the battery bay;
   an electrical consumer;
   a power connector;
   a charging device;
   means for detecting a charge status of the battery;
   a device-side charge status indicator disposed on the mobile electric appliance; and
   a controller, wherein the device-side charge status indicator is de-activated by the controller when the mobile electric appliance is operated by an external power supply system.

2. The mobile electric appliance according to claim 1, wherein the means for detecting the charge status of the battery is a device-side electronic circuit disposed in the mobile electric appliance which is electrically connected to the voltage-generating cell.

3. The mobile electric appliance according to claim 1, wherein the means for detecting the charge status of the battery is an interface to the battery, wherein the battery includes a battery-side electronic circuit for determining a charge status of the voltage-generating cell, and wherein the charge status is receivable by the interface.

4. The mobile electric appliance according to claim 1, wherein the device-side charge status indicator is activated by the controller when the electric appliance is operated by the battery.

5. The mobile electric appliance according to claim 1, wherein the device-side charge status indicator is de-activated by the controller when the electric appliance is off.

6. The mobile electric appliance according to claim 1, wherein the mobile electric appliance is a vacuum cleaner.

7. A mobile electric appliance, comprising:
an appliance housing including a battery bay;
a battery with a voltage-generating cell and a battery-side charge status indicator receivable in the battery bay;
an electrical consumer;
a power connector;
a charging device;
a detector, wherein a charge status of the battery is detectable by the detector;
a device-side charge status indicator disposed on the mobile electric appliance; and
a controller, wherein the device-side charge status indicator is de-activated by the controller when the mobile electric appliance is operated by an external power supply system.

8. The mobile electric appliance according to claim 7, wherein the detector is a device-side electronic circuit disposed in the mobile electric appliance which is electrically connected to the voltage-generating cell.

9. The mobile electric appliance according to claim 7, wherein the detector is an interface to the battery, wherein the battery includes a battery-side electronic circuit for determining a charge status of the voltage-generating cell, and wherein the charge status is receivable by the interface.

10. A mobile electric appliance, comprising:
an appliance housing including a battery bay;
an electrical consumer;
a power connector;
a charging device;
a detector, wherein a charge status of a battery disposed in the battery bay is detectable by the detector;
a device-side charge status indicator disposed on the mobile electric appliance and coupled to the detector; and
a controller, wherein the device-side charge status indicator is de-activated by the controller when the mobile electric appliance is operated by an external power supply system.

11. The mobile electric appliance according to claim 10, wherein the detector is a device-side electronic circuit disposed in the mobile electric appliance which is electrically connectable to a battery disposed in the battery bay.

12. The mobile electric appliance according to claim 10, wherein the detector is an interface to a battery disposed in the battery bay and wherein a charge status determinable by the battery is receivable by the interface.

* * * * *